(12) United States Patent
Matsumoto et al.

(10) Patent No.: US 9,741,978 B2
(45) Date of Patent: Aug. 22, 2017

(54) PULSE LASER WELDING ALUMINUM ALLOY MATERIAL, AND BATTERY CASE

(75) Inventors: Tsuyoshi Matsumoto, Fujisawa (JP); Kazunori Kobayashi, Moka (JP); Seiji Sasabe, Fujisawa (JP)

(73) Assignee: Kobe Steel, Ltd., Kobe-shi (JP)

(*) Notice: Subject to any disclaimer, the term of this patent is extended or adjusted under 35 U.S.C. 154(b) by 700 days.

(21) Appl. No.: 12/810,236

(22) PCT Filed: Dec. 18, 2008

(86) PCT No.: PCT/JP2008/073091
§ 371 (c)(1),
(2), (4) Date: Jun. 23, 2010

(87) PCT Pub. No.: WO2009/084454
PCT Pub. Date: Jul. 9, 2009

(65) Prior Publication Data
US 2010/0279171 A1    Nov. 4, 2010

(30) Foreign Application Priority Data

Dec. 28, 2007 (JP) .................................. 2007-341084
Apr. 28, 2008 (JP) .................................. 2008-117662

(51) Int. Cl.
*H01M 2/08* (2006.01)
*H01M 2/02* (2006.01)
(Continued)

(52) U.S. Cl.
CPC ........... *H01M 2/0285* (2013.01); *C22C 21/00* (2013.01); *H01M 2/0426* (2013.01);
(Continued)

(58) Field of Classification Search
CPC ................................................... H01M 2/08
(Continued)

(56) References Cited

U.S. PATENT DOCUMENTS 6,174,620 B1   1/2001   Okada et al.
6,337,136 B1   1/2002   Suzuki et al.

FOREIGN PATENT DOCUMENTS

EP   0 887 430 A1   12/1998
JP      4-196049    7/1992
(Continued)

OTHER PUBLICATIONS http://www.azom.com/article.aspx?ArticleID=2798 (Aluminum Alloys-Aluminum 1050 Properties, Fabrication and Applications, Supplier Data by Aalc) No date.*

(Continued)

*Primary Examiner* — Tracy Dove
(74) *Attorney, Agent, or Firm* — Oblon, McClelland, Maier & Neustadt, L.L.P.

(57) ABSTRACT

This aims to provide a pulse laser welding aluminum alloy material, which can prevent the occurrence of an abnormal portion, when an A1000-series aluminum material is welded with a pulse laser, so that a satisfactory welded portion can be homogeneously formed, and a battery case. The pulse laser welding aluminum alloy material is made of an A1000-series aluminum material, and has a viscosity of 0.0016 Pa·s or less in a liquid phase. Alternatively, the pulse laser welding aluminum alloy material has such a porosity generation rate of 1.5 ($\mu m^2$/mm) or less in the pulse-laser welded portion as is numerically defined by dividing the porosity total area ($\mu m^2$), as indicated by the product of the sectional area and the number of porosities, by the length (mm) of an observation section.

8 Claims, 4 Drawing Sheets

(51) Int. Cl.
C22C 21/00 (2006.01)
H01M 2/04 (2006.01)
H01M 10/052 (2010.01)

(52) U.S. Cl.
CPC ....... *H01M 2/0439* (2013.01); *H01M 2/0486* (2013.01); *H01M 10/052* (2013.01); *H01M 2002/0297* (2013.01)

(58) Field of Classification Search
USPC .......................................... 429/163, 175–177
See application file for complete search history.

(56) References Cited

FOREIGN PATENT DOCUMENTS

| | | |
|---|---|---|
| JP | 10 180438 | 7/1998 |
| JP | 11 135080 | 5/1999 |
| JP | 2000 11964 | 1/2000 |
| JP | 2000 106152 | 4/2000 |
| JP | 2000 123822 | 4/2000 |
| JP | 2001-49409 | 2/2001 |
| JP | 2001-191654 | 7/2001 |
| JP | 2003 3226 | 1/2003 |
| JP | 2005-116208 | 4/2005 |
| JP | 2009-127075 | 6/2009 |

OTHER PUBLICATIONS

Extended European Search Report issued Oct. 13, 2011, in European Patent Application No. 08867712.5.

Xingbo Yu, et al., "Investigations on Nd: YAG Laser Welding of 1.55mm thick A11050A Alloy", Proc. SPIE, vol. 2888, XP-002659646, 1996, pp. 356-363.

A. T. Dinsdale, et al., "The viscosity of aluminium and its alloys—A review of data and models", Journals of Materials Science, vol. 39, No. 24, XP-019210075, Dec. 1, 2004, pp. 7221-7228.

R. B. C. Cayless, et al., "Alloy and Temper Designation Systems for Aluminum and Aluminum Alloys", "Metals Handbook, Selection: Nonferrous Alloys and Special Purpose Materials;", ASM International, XP-002659647, 1990, pp. 15-17.

Office Action issued on Jun. 27, 2011 in the corresponding Chinese Application No. 200880123084.0 (with English Translation).

"Wrought aluminium and aluminium alloys—Chemical composition limits", GB/T3190-1996, Jul. 9, 1996, 14 pages.

Korean Office Action issued Jun. 1, 2012, in Korean Patent Application No. 2010-7014172 (with English translation).

Chinese Office Action issued in Chinese Application No. 200880123084.0 on Jun. 25, 2012 (w/ English Translation).

European Office Action issued in European Application No. 12 003 633.0 on Aug. 1, 2012.

Zhu-tang Whang, "The Properties of High Pure Aluminum (Part A)," China Academic Journal Electronic Publishing, pp. 3-6, (Aug. 2004).

Gladush et al., "Peculiarities of Welding of Metals by a Low-Power Repetitively Pulsed Nd:YAG laser," IOP Science, http://iopscience.iop.org/1063-7818/36/11/A16, Quantum Electron 36 1080 (2006).

"Wrought aluminium and aluminium alloys—chemical composition limits", GB Standard of P.R. China, GB/T 3190, Jul. 9, 1996, pp. 3-17 with English language translation.

Zhou et al., "Porosity Formation and Prevention in Pulsed Laser Welding," 129 Journal of Heat Transfer, Transactions of the ASME pp. 1014-1024 (Aug. 2007).

* cited by examiner

PULSE LASER WELDING ALUMINUM ALLOY MATERIAL, AND BATTERY CASE

TECHNICAL FIELD

The present invention relates to: a pulse laser welding aluminum alloy material suitable for sealing weld with a pulse laser; and a battery case produced by using the aluminum alloy material and applying pulse laser welding.

BACKGROUND ART

Traditionally, a nickel hydride battery has been primarily used as a fuel battery for an automobile but, in recent years, the adoption of a lithium-ion battery that has been used in a portable phone, a personal computer, or the like is considered because of a light weight and a high operating voltage.

A lithium-ion battery constitutionally gives functions as an electrode to a battery case including a body and a lid and an aluminum material of a high electrical conductivity is used as the battery case material. Further, an aluminum material can withstand deep drawing and hence can be used for producing a square or round container for a battery case through a forming process.

When a battery is used alone in a portable phone or the like, a strong AA3000-series aluminum alloy is used for the body and the lid of a battery case in order to prevent swelling. A battery case of this kind is bonded by applying laser welding to the body and the lid, both comprising an aluminum alloy material, along the periphery of the lid.

Patent Documents 1 and 2 disclose a method for producing a battery case by: interposing a brazing material having a lower melting point than an aluminum alloy material at the joint interface between the case main body and the lid, both comprising an A3003 aluminum alloy; and bonding the joint interface by solid-phase diffusion bonding of the aluminum material.

Patent Document 3 discloses a battery case the corrosion resistance of which is improved by forming a film of synthetic-resin paint, a film of ceramic coating, or a film of aluminum oxide coating on the outer surface of the battery case made of aluminum or an aluminum alloy.

Patent Document 4 discloses a method for producing a lithium-ion secondary battery by bonding a lid comprising a JIS-A3003 aluminum alloy to the opening of a closed-end square-tube-shaped outer case comprising the JIS-A3003 aluminum alloy by laser welding. Here, Patent Document 4 further describes a JIS-A1050 aluminum material as a material for a battery case.

Patent Document 1: JP-A 180438/1998 (H10)
Patent Document 2: JP-A 11964/2000
Patent Document 3: JP-A 106152/2000
Patent Document 4: JP-A 123822/2000

DISCLOSURE OF THE INVENTION

Problem to be Solved by the Invention

As stated above, a conventional lithium-ion battery is used for a portable phone or a personal computer and an AA3000-series aluminum alloy of a high strength is used as the material for a battery case in order to prevent the case from swelling. In the case of a fuel battery for an automobile however, a plurality of fuel batteries are aligned in layers while interposing resin spacers in between and hence a problem such as swelling does not arise even when the raw material does not have a high strength. Consequently, the use of an A1000-series aluminum material (a pure aluminum material), which has a low strength but a high electrical conductivity, for a lithium-ion battery as a fuel battery of an automobile is studied.

Figure 5:
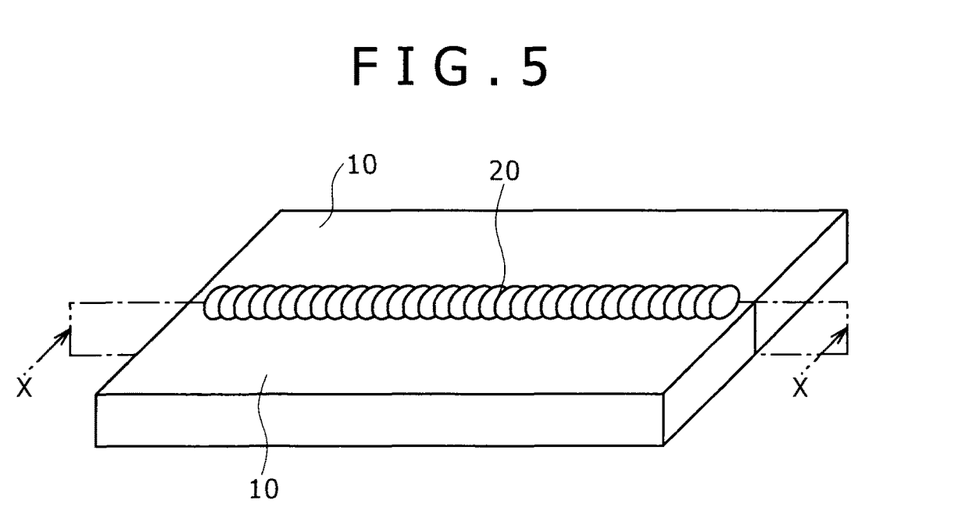
FIG. 5 is a perspective view showing a portion welded with a pulse laser.
Figure 6:
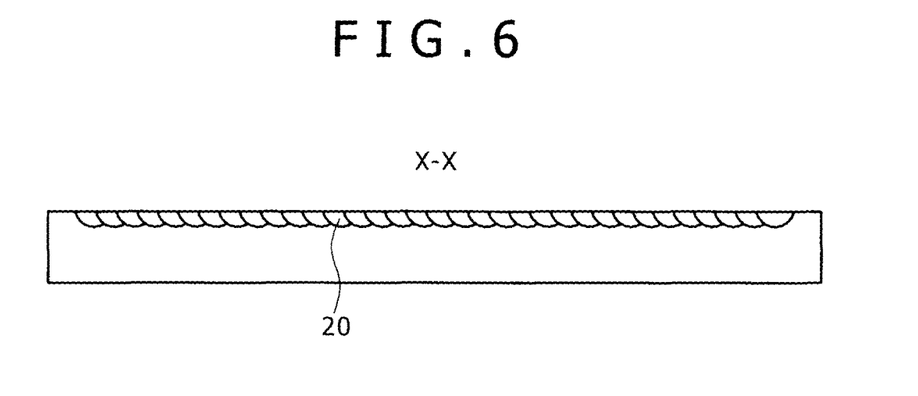
FIG. 6 is a sectional view taken on line X-X of FIG. 5 and represents a good welded portion.
Figure 7:
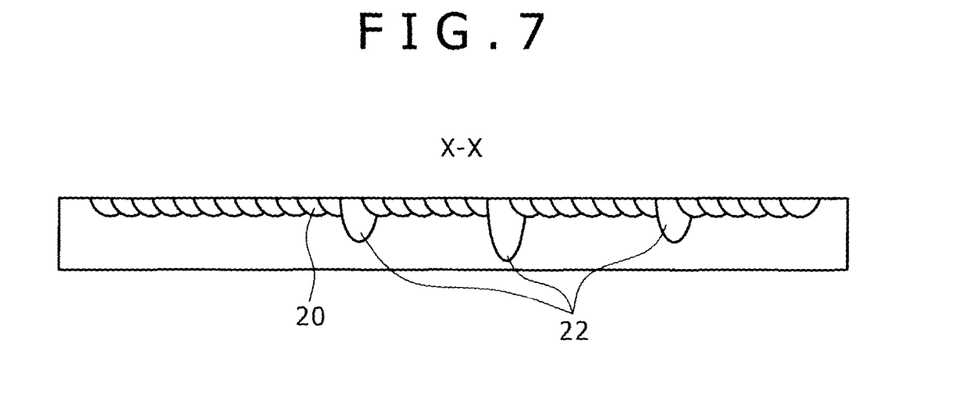
FIG. 7 is a sectional view taken on line X-X of FIG. 5 and represents abnormal welded portions.

FIG. 5 is a schematic perspective view showing a welded portion 20 after subjected to pulse laser welding. FIGS. 6 and 7 are sectional views taken on line X-X of FIG. 5; FIG. 6 represents a good welded portion 20 and FIG. 7 represents a welded portion 20 having abnormal portions 22. A welded portion (a weld bead) 20 having a shape of consecutive arcs is formed by butting a pair of materials 10 to be welded, thereby forming an I-shaped groove, and applying pulse laser welding to the groove (the butting portion).

Figure 4:
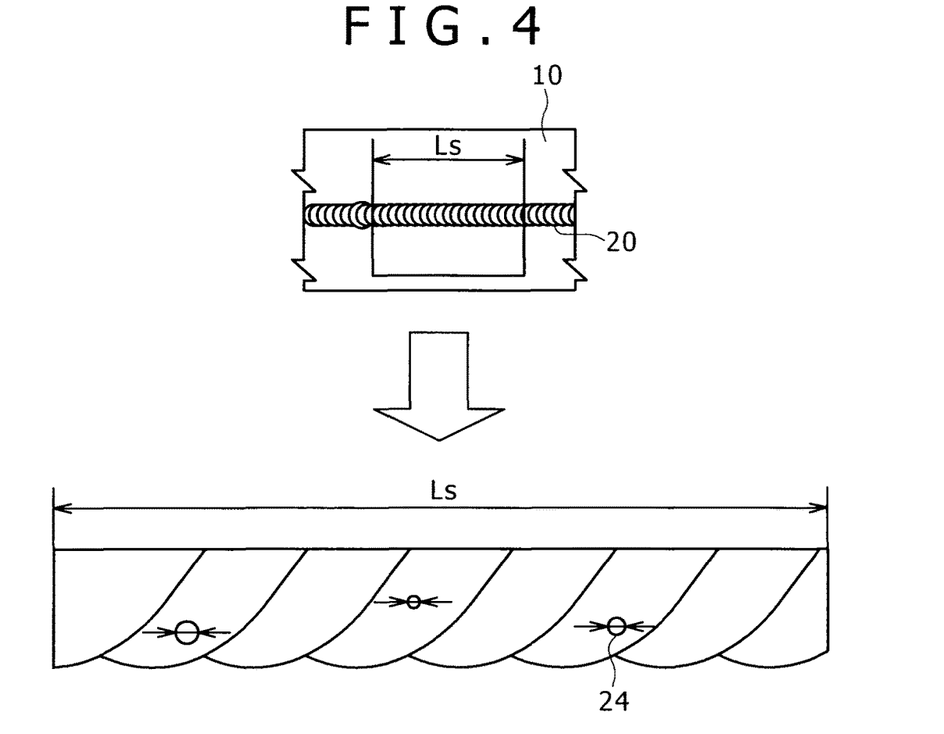
FIG. 4 is a view showing a method for measuring a porosity generation rate.

An A1000-series aluminum material has also a good thermal conductivity and hence pulse laser welding of a high energy density is used in the pulse laser welding used for sealing weld. The pulse laser welding method is a method of applying welding while weld pools are formed in series by sequentially irradiating the welded portion with a pulsed laser and the laser irradiated portion is shifted along the weld line. By so doing, a welded portion (a weld bead) 20 having a shape of consecutive arcs is formed at the butting portion of the materials 10 to be welded as shown in FIG. 4.

Such pulse laser welding of an A1000-series aluminum material however has a problem in that the material components such as impurities in a raw material and the surface condition of the raw material influence the width and the depth of weld penetration and the melt zone tends to change in an unexpected fashion. Consequently, it is likely that, on a weld line, a large weld pool is formed in an unexpected fashion, thereafter the weld pool solidifies and an abnormal portion 22 is locally formed, and the discontinuity of the welded portion 20 occurs as shown in FIG. 7. It is possible that an abnormal portion 22 comes to be weld penetration going through up to the rear surfaces of the materials 10 to be welded and adversely influences the performance including electrical conductivity, operating voltage, and others.

The present invention has been established in view of the above problems and an object of the present invention is to provide: a pulse laser welding aluminum alloy material that can prevent an abnormal portion from occurring and can homogeneously form a good welded portion when an A1000-series aluminum material is welded with a pulse laser; and a battery case.

Means for Solving the Problem

A pulse laser welding aluminum alloy material according to the first invention in the present patent application is characterized by comprising an A1000-series aluminum material and having a viscosity of 0.0016 Pa·s or less in a liquid phase.

In such a pulse laser welding aluminum alloy material, the viscosity is preferably 0.0012 Pa·s or less.

Further, a pulse laser welding aluminum alloy material according to the second invention in the present patent application is characterized in that: the aluminum alloy material comprises an A1000-series aluminum material; and a porosity generation rate at a pulse laser welded portion numerically defined by dividing the total porosity sectional area ($\mu m^2$) indicated by the product of the sectional area and the number of porosities by the length (mm) of the observation section is 1.5 ($\mu m^2$/mm) or less.

On this occasion, the porosity generation rate is preferably 1.1 ($\mu m^2$/mm) or less.

Such a pulse laser welding aluminum alloy material preferably comprises Si: 0.35 mass % or less, Fe: 0.6 mass % or less, Cu: 0.1 mass % or less, Mn: 0.05 mass % or less, Mg: 0.05 mass % or less, Zn: 0.1 mass % or less, Ti: 0.1 mass % or less, and B: 6 ppm or less, with the remainder consisting of Al and unavoidable impurities.

Further, a battery case according to the present invention is characterized by being produced by: using a pulse laser welding aluminum alloy material described above for a case main body and a lid; and welding and sealing the case main body and the lid with a pulse laser. The battery case is used for a lithium-ion battery, for example.

Effect of the Invention

The present invention makes it possible, in an A1000-series aluminum material, to prevent an abnormal portion from forming locally on the occasion of pulse laser welding by regulating a viscosity in a liquid phase or a porosity generation rate at a pulse laser welded portion.

EXPLANATIONS OF REFERENCE SYMBOLS

10 Material to be welded (aluminum material)
20 Welded portion (weld bead)
22 Abnormal portion (abnormal penetration)
24 Porosity
30 Vibration generator
32 Vibrating reed
34 Laser displacement meter

BEST MODE FOR CARRYING OUT THE INVENTION

The present invention is hereunder explained in detail. The alloy designations of the aluminum alloys in the following explanations conform to Japanese Industrial Standards (JIS). An A1000-series aluminum material, in particular an A1035 to A1080 aluminum material, has a composition of Si: 0.35 mass % or less, Fe: 0.6 mass % or less, Cu: 0.1 mass % or less, Mn: 0.05 mass % or less, Mg: 0.05 mass % or less (including 0%), Zn: 0.1 mass % or less (including 0%), Ti: 0.1 mass % or less (including 0%), and B: 6 ppm or less (including 0%), with the remainder consisting of Al and unavoidable impurities. The A1000-series aluminum alloy material has a high electrical conductivity and an excellent weldability. Here, in the present invention, the term "an aluminum alloy material" includes not only an alloyed material but also a material not completely metallurgically alloyed. Further, it is preferable not to contain Mg, Zn, Ti, and B as far as possible from the viewpoint of pulse laser weldability, namely the control of an irregular bead. With regard to Si, Fe, Cu, and Mn, the contents of those elements are acceptable as long as they are in the ranges of ordinary 1000-series alloys.

[First Invention: Viscosity in Liquid Phase]

The present inventors have conducted various tests and studies with the aim of developing a raw material that can eliminate the drawbacks caused when an A1000-series aluminum material excellent as a raw material for a lithium-ion battery case is welded with a pulse laser as stated above while the advantages of the raw material are maintained. As a result, the present inventors have found that the viscosity at a temperature at which a raw material melts (660° C. to 750° C.) largely influences the occurrence of an abnormal portion 22 that is an irregular bead caused by a pulse laser.

At the time of welding, a laser irradiated portion of a material to be welded and the vicinity thereof have a temperature exceeding the melting point and are in a molten state and bubbles caused by hydrogen, a shield gas, or metallic vapor exist in a weld pool. When laser irradiation is finished, the temperature drops and the process moves toward a solidification process. In particular, if the viscosity of a material to be welded exceeds a certain value in the temperature range close to 700° C. before the temperature reaches the melting point, the bubbles tend to hardly go off and remain in the state as porous defects. In reference to FIGS. 5 to 7, in the case of pulse welding, generally a material is irradiated with a succeeding laser beam so that a weld bead 20 having been completely solidified may be overlaid with a succeeding weld bead 20. When a completely solidified weld bead 20 melts again by the irradiation of a laser beam, by being irradiated with a laser beam, the remaining porosities that have come to be bubbles again expand, keyholes formed by ordinary laser beam irradiation bloat, and the laser beam tends to intrude deeply. It is estimated that resultantly penetration is formed deeply and comes to be an abnormal penetration (an abnormal portion 22).

Consequently, the viscosity in a liquid phase of a pulse laser welding aluminum alloy material according to the present invention is 0.0016 Pa·s or less, preferably 0.0012 Pa·s or less. If the viscosity in a liquid phase exceeds 0.0016 Pa·s, bubbles hardly go off from a weld pool, porous defects remain at a weld bead 20, penetration is formed deeply, and an abnormal portion 22 tends to occur. A preferable viscosity in a liquid phase is 0.0012 Pa·s or less.

Figure 1:
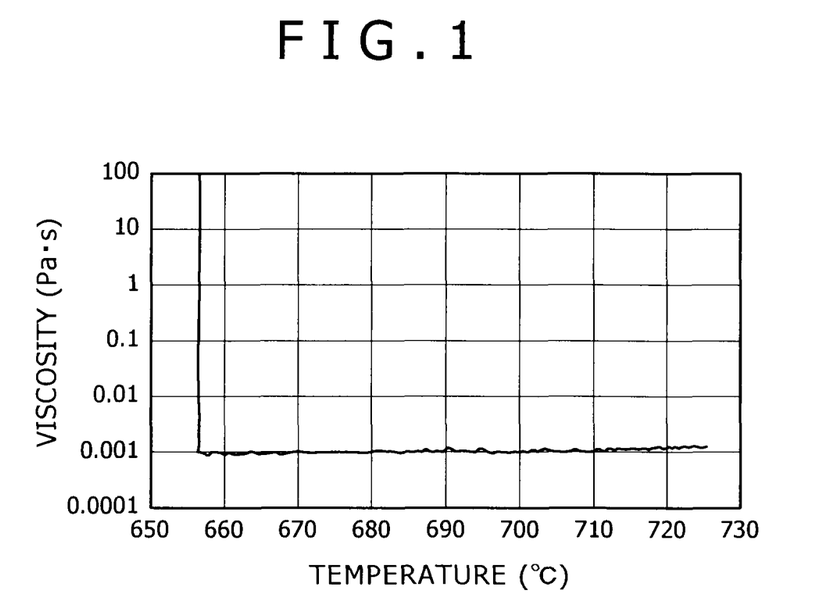
FIG. 1 is a graph showing a measurement result of the viscosity of an A1000-series aluminum material (composition: Example 1 in Table 1).
Figure 2:
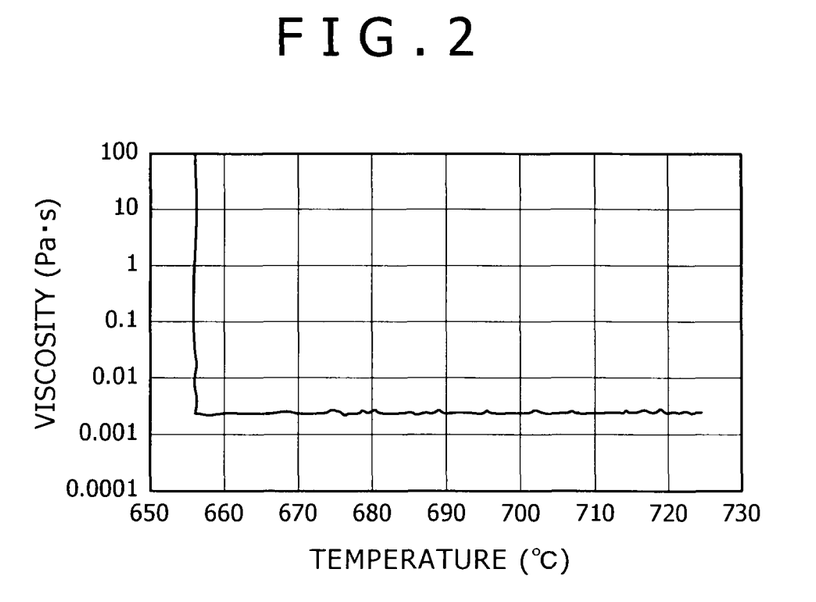
FIG. 2 is a graph showing a measurement result of the viscosity of an A1000-series aluminum material (composition: Comparative example 4 in Table 1).

Alloy components may be adjusted in order to obtain a prescribed viscosity in a liquid phase. More specifically, a prescribed viscosity in a liquid phase can be obtained by adjusting the quantities of Ti, B, and other elements and further Na, Cl, and other elements. Na may be contained up to 0.001 mass % and Cl may be contained also up to 0.001 mass %. FIGS. 1 and 2 show measurement results of the viscosities of A1000-series aluminum materials having different components. The aluminum material used in the measurement of FIG. 1 has the composition of Example 1 shown in Table 1 and the aluminum material used in the measurement of FIG. 2 has the composition of Comparative example 4 shown in the same table.

Figure 3:
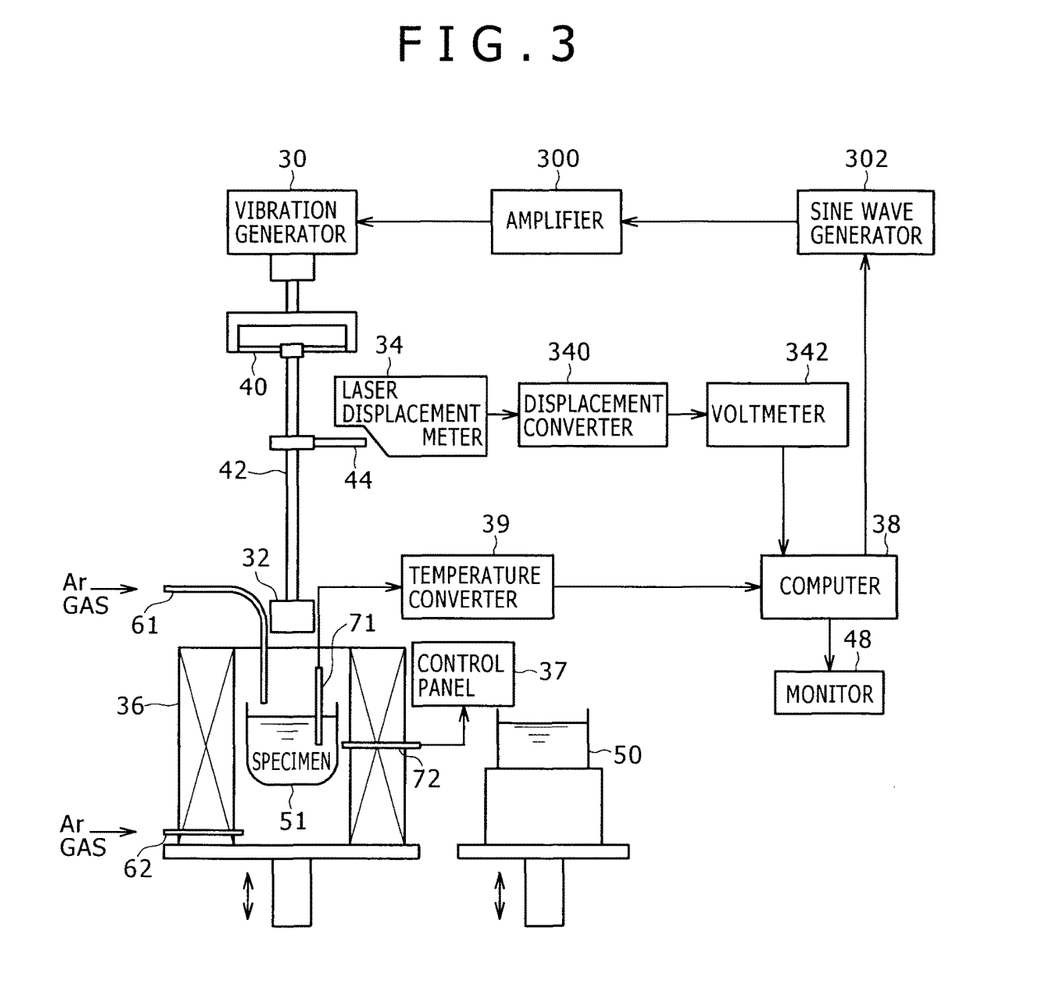
FIG. 3 is a view showing a viscosity measurement apparatus by a vibration method.

A viscosity is measured with a viscosity measurement apparatus shown in FIG. 3. With the apparatus, a viscosity is measured by a vibration method. A thermometer 72 is inserted into an electric furnace 36 and a control panel 37 controls the electric furnace 36 to a prescribed temperature by feedback control on the basis of the electric furnace temperature measured with the thermometer 72. Molten metal 51 of an aluminum material specimen is contained in a container and placed in the electric furnace 36 and the molten metal 51 of the aluminum material is maintained at a prescribed temperature with the electric furnace 36. The temperature of the molten metal is measured with a thermometer 71, converted into voltage with a temperature converter 39, and thereafter inputted into a computer 38. Here, the electric furnace 36 is designed so as to contain a liquid 50 of a JIS standard viscosity in place of the molten metal 51 in the interior. The electric furnace 36 is further designed so as to introduce Ar gas through pipes 61 and 62. A vibration generator 30 comprising a shaker for industrial use is installed above the electric furnace 36 and a plate spring 40 is installed at a drive section of the vibration generator 30. A support bar 42 is suspended by the plate spring 40 and a vibrating reed 32 is installed at the bottom end of the support bar 42. The vibrating reed 32 is made of a material not reacting with the molten metal of aluminum such as platinum or alumina. A mirror 44 is fixed in the middle of the support bar 42 and a laser displacement meter 34 is installed in the manner of facing the mirror 44. The laser displacement meter 34 detects a laser beam reflected from the mirror 44 and outputs the detected laser beam to a displacement converter 340. The displacement converter 340 converts the displacement of the mirror 44 to voltage on the basis of the laser beam reflected from the mirror 44 and outputs the voltage to a voltmeter 342. The voltmeter 342 outputs the measured displacement value to the computer 38 as a voltage value.

Further, a signal to generate a prescribed sine wave oscillation from the vibration generator 30 is outputted from the computer 38 to a sine wave generator 302, the sine wave generator 302 outputs a sine wave to an amplifier 300, and the amplifier 300 amplifies the sine wave, thereafter outputs the amplified sine wave to the vibration generator 30, and sinusoidally vibrates the vibration generator 30. The vibration of the vibration generator 30 is transferred to the vibrating reed 32 through the plate spring 40. Here, a monitor 48 is connected to the computer 38.

In a viscosity measurement apparatus configured as stated above, after the interior of an electric furnace 36 is filled with an Ar gas atmosphere, the molten metal 51 of an aluminum alloy is inserted into the electric furnace 36, the whole electric furnace 36 is elevated upward, and a vibrating reed 32 is dipped into the molten metal 51. Then sinusoidal vibration is imposed from a vibration generator 30 on the vibrating reed 32, and the displacement of the vibrating reed 32 is detected as the displacement of a mirror 44 with a laser displacement meter 34 and inputted into a computer 38. The temperature of the molten metal 51 is also inputted into the computer 38 and the viscosity in a liquid phase of the molten metal 51 is computed with the computer 38.

A viscosity is computed with the following numerical expression 1. Firstly, a calibration curve is obtained beforehand from a displacement measured with the vibrating reed 32 by using three kinds of JIS viscosity standard liquids 50 having different viscosities conforming to JIS Z8803 or Z8809. Then a viscosity μ is obtained with the following numerical expression 1.

[Numerical Expression 1]

$$\rho\mu = K(E_a/E - 1)^2 \quad (1)$$

$$K = R_m^2 / \pi f_a A^2$$

Here,
ρ: Specimen density (kg/m³)
μ: Liquid viscosity (Pa·s)
$E_a$: Amplitude in air (m)
E: Amplitude in specimen (m)
$R_m$: Resistance fraction of mechanical impedance (kg·m/s)
f: Resonant frequency in specimen (Hz)
$f_a$: Resonant frequency in air (Hz)
A: Area of vibrating reed (m²)

As a result, as shown in FIGS. 1 and 2, when the temperature of the electric furnace 36 is raised to 725° C. and thereafter lowered at a prescribed cooling rate, the viscosity rapidly increases at a temperature of about 657° C. and the molten metal 51 of an aluminum material solidifies. On this occasion, as shown in FIGS. 1 and 2, each of the viscosities is constant during the decrease of the temperature. The viscosity value varies however in accordance with the composition of the molten metal 51. In this way, the viscosity of the molten metal 51 can be measured.

[Second Invention: Porosity Generation Rate at Pulse Laser Welded Portion]

Successively, the second invention in the present patent application is explained on the basis of another viewpoint. As stated above, the occurrence of an abnormal portion is largely influenced by the viscosity at a temperature at which a raw material melts (660° C. to 750° C.) in pulse laser welding. The viscosity in a liquid phase relates to the occurrence of porous defects in a pulse laser welded portion.

At welding, a laser irradiated portion comes to be in a molten state and bubbles caused by hydrogen, a shield gas, metallic vapor or the like exist in a weld pool. The bubbles are light and hence go off immediately from the surface of the weld pool. Meanwhile, when laser irradiation of one pulse is finished, the process moves toward a solidification process. When the viscosity of a material to be welded is higher than a certain value at a temperature region before the temperature reaches the solidification commencement temperature in particular, the bubbles hardly go off and tend to remain in the state as porous defects. In the case of pulse welding, a material is irradiated with a succeeding laser beam so that a weld bead having been completely solidified may be overlaid with a succeeding weld bead. When a completely solidified weld bead melts again by the irradiation of a laser beam, the remaining porosities are irradiated with the laser beam, the porosities expand, generally keyholes formed by laser beam irradiation bloat, and the laser beam tends to intrude deeply. As a result, penetration is formed deeply and comes to be an abnormal penetration site. The abnormal penetration site solidifies and an abnormal portion (an abnormal portion 22) occurs at a welded portion.

Consequently, the occurrence of porous defects, which is estimated to be related with sudden occurrence of a bead abnormal portion at pulse laser welding of an A1050 alloy, is observed. Porosities are measured by microscopic observation since a porosity diameter is a size that cannot be judged by a radiotransparent test. That is, as shown in FIG. 4, a test piece of a length Ls in the direction of a weld line is taken from a pulse laser welded material 10 in the manner of including a weld bead 20 and embedded into resin, and the cross section of the welded portion is polished up to the center of the welded portion in the width direction. Then the polished face is observed at a magnification of 400 to 1,000 times with a microscope and the sizes, the number, and the locations of porosities 24 are measured. The sizes of the porosities are classified visually into 5 categories in total comprising 4 categories of 1.25 μm intervals from the minimum diameter 2.5 μm to 7.5 μm and 1 category of over 7.5 μm by using the scale of the microscope. Further, with regard to the state of the occurrence of the porosities 24, on an observation face of a length Ls in the direction of the weld line, a porosity generation rate is computed by: computing the areas of the generated porosities 24 from the diameters of the porosities 24; multiplying the areas by the number of the porosities 24 included in the ranges of the areas; obtaining the total sectional area of all the area ranges; and dividing the total sectional area by the observation length Ls. That is, a porosity generation rate is computed with the following numerical expression 2.

[Numerical Expression 2]

$$\text{Porosity generation rate } (\mu m^2/mm) = (\text{total porosity sectional area on an observed cross section } (\text{area} \times \text{number}))/Ls \quad (2)$$

As a result, bead appearance is good when a porosity generation rate is 1.5 $\mu m^2/mm$ or less but disorder in bead appearance occurs when a porosity generation rate exceeds 1.5 $\mu m^2/mm$. Further, the occurrence of such a weld abnormal portion has correlation with the content of B+Ti in an aluminum alloy material. If B exceeds 6 ppm in particular, the porosity generation rate exceeds 1.5 $\mu m^2/mm$ and the shape of a bead deforms. From the above result, by controlling a porosity generation rate to 1.5 $\mu m^2/mm$ or less, it is possible to prevent a bead abnormal portion from occurring and obtain good bead appearance. Preferably, a porosity generation rate is 1.1 $\mu m'/mm$ or less and a B content is 6 ppm or less.

A battery case according to the present invention is produced by using a pulse laser welding aluminum alloy material according to the aforementioned present invention for a case main body and a lid and welding with a pulse laser and sealing the case main body and the lid. The battery case is used particularly for a lithium-ion battery.

EXAMPLES

Examples according to the present invention are hereunder explained in comparison with Comparative examples. The compositions of aluminum materials used in the present tests are shown in Table 1 below. The viscosity of a test material is measured with the measurement apparatus shown in FIG. 3. Further, a porosity generation rate is measured in the manner shown in FIG. 4.

TABLE 2

| | Output per pulse (J) | Frequency (Hz) | Laser output (W) | Remarks |
|---|---|---|---|---|
| Condition 1 | 12 | 20 | 240 | Standard condition |
| Condition 2 | 13.5 | 20 | 270 | Excessive heat input condition |
| Condition 3 | 11 | 20 | 220 | Lower limit condition (low heat input) |

In each of Examples 1 to 7 and Comparative examples 1 to 7 shown in Table 1, aluminum materials 10 having a thickness of 1 mm are placed so as to butt the end faces against each other as shown in the perspective view of FIG. 5 and the butted portion is welded with a pulse laser. Circular welded portions 20 each of which is formed by forming a weld pool with one pulse laser and solidifying are consecutively overlaid and formed along a weld line in accordance with the movement of the laser. As the welder, a pulse oscillating YAG laser is used, the weld speed is 30 mm/min., and nitrogen is supplied at the rate of 20 liters/min. as the shield gas. With regard to the laser output, three conditions (Conditions 1 to 3) comprising a standard condition for obtaining a prescribed joint strength, an excessive heat input condition on the assumption of unexpected abnormality at welding, and a lower limit condition as shown in Table 2 are adopted.

In the evaluations, a case where no abnormal portion 22 occurs even under the excessive heat input condition (Condition 2) is represented by the symbol ⊚, a case where no abnormal portion 22 occurs under the standard condition (Condition 1) is represented by the symbol ○, a case where an abnormal portion 22 occurs under the standard condition (no abnormal portion 22 occurs under the low heat input condition (Condition 3)) is represented by the symbol Δ, and a case where an abnormal portion 22 occurs under any of the conditions is represented by the symbol X, and they are collectively shown in Table 1.

As shown in Table 1, in the materials of Examples 1 to 5 and 7 each of which has a viscosity of 0.0016 Pa·s or less, no abnormal portion occurs when pulse laser welding is applied. Further, in Examples 1 and 2 having a viscosity of 0.0012 Pa·s or less, no abnormal portion occurs even when the laser input is high. In contrast, in Comparative examples 1 to 7 each of which has a viscosity exceeding 0.0016 Pas,

TABLE 1

| No. | | Si | Fe | Cu | Mn | Mg | Cr | Zn | Ti | B (ppm) | Al | Viscosity (Pa · s) | Porosity generation rate | Bead shape |
|---|---|---|---|---|---|---|---|---|---|---|---|---|---|---|
| Example | 1 | 0.07 | 0.28 | 0.01 | 0.00 | 0.00 | 0.00 | 0.00 | 0.004 | 4 | Remainder | 0.0009 | 0.7 | ⊚ |
| | 2 | 0.06 | 0.30 | 0.00 | 0.00 | 0.01 | 0.00 | 0.00 | 0.007 | 5 | Remainder | 0.0012 | 1.1 | ⊚ |
| | 3 | 0.05 | 0.29 | 0.00 | 0.00 | 0.00 | 0.00 | 0.00 | 0.009 | 6 | Remainder | 0.0016 | 1.3 | ○ |
| | 4 | 0.09 | 0.25 | 0.01 | 0.00 | 0.00 | 0.00 | 0.00 | 0.008 | 5 | Remainder | 0.0014 | 1.3 | ○ |
| | 5 | 0.04 | 0.25 | 0.02 | 0.00 | 0.00 | 0.00 | 0.01 | 0.002 | 5 | Remainder | 0.0013 | 1.5 | ○ |
| | 6 | 0.06 | 0.26 | 0.01 | 0.00 | 0.00 | 0.00 | 0.00 | 0.001 | 5 | Remainder | 0.0017 | 1.3 | ○ |
| | 7 | 0.05 | 0.25 | 0.01 | 0.00 | 0.01 | 0.00 | 0.00 | 0.002 | 6 | Remainder | 0.0014 | 1.6 | ○ |
| Comparative Example | 1 | 0.08 | 0.35 | 0.01 | 0.00 | 0.00 | 0.00 | 0.00 | 0.011 | 7 | Remainder | 0.0017 | 2.3 | Δ |
| | 2 | 0.09 | 0.15 | 0.02 | 0.00 | 0.01 | 0.00 | 0.01 | 0.025 | 12 | Remainder | 0.0020 | 3.5 | X |
| | 3 | 0.06 | 0.29 | 0.00 | 0.00 | 0.00 | 0.00 | 0.00 | 0.016 | 10 | Remainder | 0.0018 | 1.6 | Δ |
| | 4 | 0.07 | 0.39 | 0.01 | 0.00 | 0.01 | 0.00 | 0.00 | 0.024 | 15 | Remainder | 0.0021 | 6.7 | X |
| | 5 | 0.05 | 0.25 | 0.02 | 0.00 | 0.00 | 0.00 | 0.00 | 0.041 | 30 | Remainder | 0.0025 | 9.1 | X |
| | 6 | 0.05 | 0.15 | 0.00 | 0.00 | 0.01 | 0.00 | 0.00 | 0.031 | 16 | Remainder | 0.0022 | 5.7 | X |
| | 7 | 0.06 | 0.60 | 0.01 | 0.00 | 0.01 | 0.00 | 0.02 | 0.026 | 22 | Remainder | 0.0028 | 8.2 | X | the occurrence of abnormal portions 22 (the number of abnormal penetrations) is high even though the contents of Si, Fe, and others are almost at the same level as Examples 1 to 5. As a result, the evaluations of the bead shapes are rated as the symbols Δ and X.

As stated above, in a pulse laser welding aluminum alloy material comprising Si: 0.35 mass % or less, Fe: 0.6 mass % or less, Cu: 0.1 mass % or less, Mn: 0.05 mass % or less, Mg: 0.05 mass % or less, Zn: 0.1 mass % or less, Ti: 0.1 mass % or less, and B: 6 ppm or less, with the remainder consisting of Al and unavoidable impurities, it is possible to obtain a stable weld bead 20 when the alloy material is welded with a pulse laser by regulating the viscosity in the liquid phase of the alloy material to 0.0016 Pa·s or less.

Further, in an aluminum alloy material of the same composition, by regulating the viscosity in the liquid phase of the alloy material to 0.0012 Pa·s or less like Examples 1 and 2, it is possible to obtain a stable weld bead 20 when the alloy material is welded with a pulse laser and even a larger quantity of heat is added.

Successively, with regard to Examples 1 to 7 and Comparative examples 1 to 7 shown in Table 1, the result of investigating the relationship between a porosity generation rate and a bead shape is explained. In the case where a porosity generation rate is 1.5 $\mu m^2$/mm or less like Examples 1 to 6, the bead shape is evaluated as the symbol ⊚ or ○ and an abnormal portion is prevented from occurring. Here, in Examples 1 and 2 where a porosity generation rate is 1.1 $\mu m^2$/mm or less, the bead shape is evaluated as the symbol ⊚ and no abnormal portion occurs even under excessive heat input condition. In contrast, when a porosity generation rate exceeds 1.5 $\mu m^2$/mm like Comparative examples 1 to 7, the bead shape is evaluated as the symbol Δ or X and an abnormal portion occurs under the standard condition.

Further, in Example 6, although the viscosity exceeds 0.0016 Pa·s, the porosity generation rate is 1.5 $\mu m^2$/mm or less and hence the bead shape is evaluated as the symbol ○. Further, in Example 7, although the porosity generation rate exceeds 1.5 $\mu m^2$/mm, the viscosity is 0.0016 Pa·s or less and hence the bead shape is evaluated as the symbol ○. Consequently, as long as either a viscosity or a porosity generation rate satisfies the regulation of the present invention, an abnormal portion is prevented from occurring under the standard condition.

The invention claimed is:

1. A pulse laser welding aluminum alloy material comprising an A1000-series aluminum material and having a viscosity of 0.0016 Pa·s or less in a liquid phase,
   wherein the aluminum alloy material comprises:
   Si: 0.35 mass % or less,
   Fe: 0.6 mass % or less,
   Cu: 0.1 mass % or less,
   Mn: 0.05 mass % or less,
   Mg: 0.05 mass % or less,
   Zn: 0.1 mass % or less,
   Ti: 0.1 mass % or less and 0.001 mass % or more, and
   B: 6 ppm or less,
   with the remainder consisting of Al and unavoidable impurities, and
   wherein boron is present in the aluminum alloy material and is present in an amount of 6 ppm or less.

2. A pulse laser welding aluminum alloy material according to claim 1, wherein the viscosity is 0.0012 Pa·s or less.

3. A pulse laser welding aluminum alloy material wherein: the aluminum alloy material comprises an A1000-series aluminum material; and a porosity generation rate at a pulse laser welded portion numerically defined by dividing the total porosity sectional area ($\mu m^2$) indicated by the product of the sectional area and the number of porosities by the length (mm) of the observation section is 1.5 ($\mu m^2$/mm) or less,
   wherein the aluminum alloy material comprises:
   Si: 0.35 mass % or less,
   Fe: 0.6 mass % or less,
   Cu: 0.1 mass % or less,
   Mn: 0.05 mass % or less,
   Mg: 0.05 mass % or less,
   Zn: 0.1 mass % or less,
   Ti: 0.1 mass % or less and 0.001 mass % or more, and
   B: 6 ppm or less,
   with the remainder consisting of Al and unavoidable impurities, and
   wherein boron is present in the aluminum alloy material and is present in an amount of 6 ppm or less.

4. A pulse laser welding aluminum alloy material according to claim 3, wherein the porosity generation rate is 1.1 ($\mu m^2$/mm) or less.

5. A method for producing a battery case comprising:
   using a pulse laser welding aluminum alloy material for a case main body and a lid; and
   welding and sealing the case main body and the lid with a pulse laser,
   wherein the aluminum alloy includes an A1000-series aluminum material and has a viscosity of 0.0016 Pa·s or less in a liquid phase,
   wherein the aluminum alloy material comprises:
   Si: 0.35 mass % or less,
   Fe: 0.6 mass % or less,
   Cu: 0.1 mass % or less,
   Mn: 0.05 mass % or less,
   Mg: 0.05 mass % or less,
   Zn: 0.1 mass % or less,
   Ti: 0.1 mass % or less and 0.001 mass % or more, and
   B: 6 ppm or less,
   with the remainder consisting of Al and unavoidable impurities, and
   wherein boron is present in the aluminum alloy material and is present in an amount of 6 ppm or less.

6. A pulse laser welding aluminum alloy material according to claim 1, wherein the aluminum alloy has Ti of 0.004 mass % and B of 4 ppm.

7. A pulse laser welding aluminum alloy material according to claim 1, wherein the aluminum alloy has Ti of 0.007 mass % and B of 5 ppm.

8. A pulse laser welding aluminum alloy material according to claim 1, wherein the aluminum alloy has B of 4-6 ppm.

* * * * *